Feb. 6, 1923. 1,444,447.
J. W. BATE.
SCREW JACK.
FILED JULY 22, 1921.
2 SHEETS—SHEET 2.
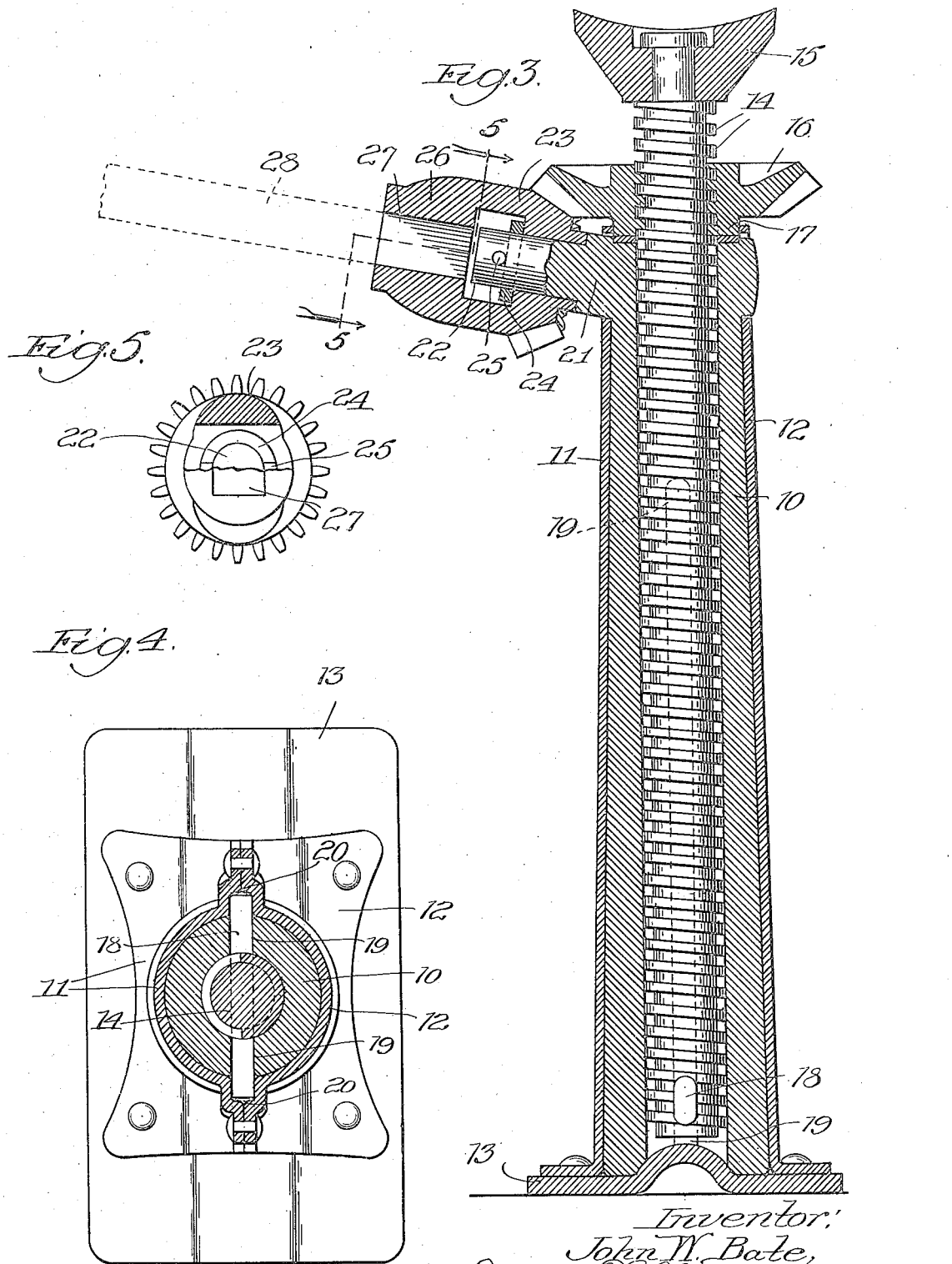

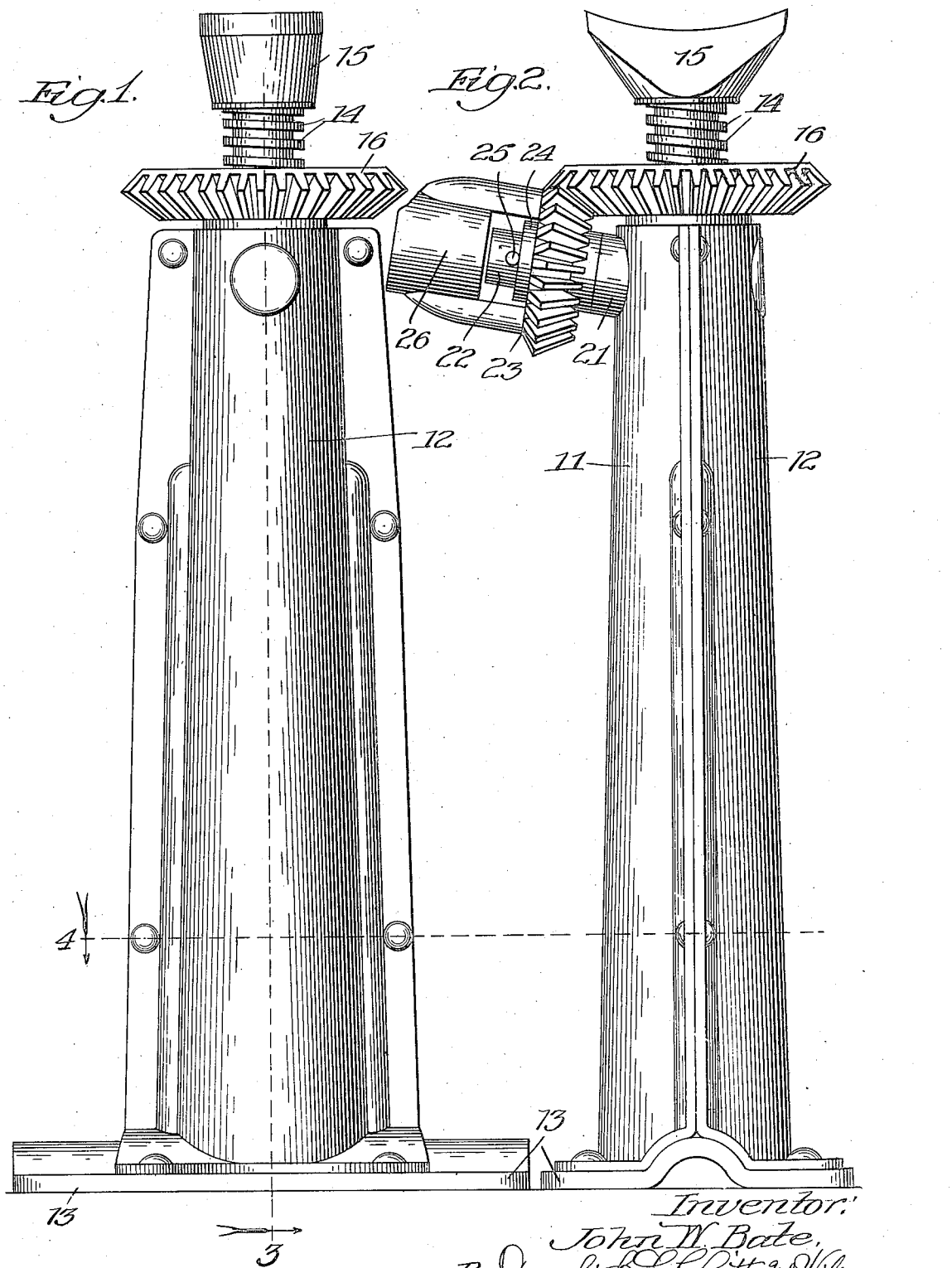

Patented Feb. 6, 1923.

1,444,447

UNITED STATES PATENT OFFICE.

JOHN W. BATE, OF RACINE, WISCONSIN.

SCREW JACK.

Application filed July 22, 1921. Serial No. 486,688.

*To all whom it may concern:*

Be it known that I, JOHN W. BATE, a citizen of the United States, residing at Racine, in the county of Racine and State of Wisconsin, have invented a new and useful Improvement in Screw Jacks, of which the following is a specification.

This invention relates to screw jacks and is fully described in the following specification and shown in the accompanying drawings in which:

Figure 1 is a rear elevation of the jack;

Fig. 2 is a side elevation of the same;

Fig. 3 is a vertical section on the line 3 of Fig. 1;

Fig. 4 is a horizontal section on the line 4 of Fig. 1; and

Fig. 5 is a combined elevation and section on the line 5—5 of Fig. 3.

In the embodiment illustrated the jack consists of a hollow standard 10 enclosed in a hollow casing consisting of similar side members 11 and 12 and a base 13. These sheet metal members are secured together by means of rivets or other similar fastenings.

The standard 10 has a longitudinal hole therethrough in which is slidably mounted a screw 14 which has a plate 15 pivotally mounted at its upper end. A bevel gear 16 is internally threaded to turn upon the screw 14 and has a boss 17 upon its lower face which bears upon the upper end of the standard 10 and carries the load placed upon the plates 15.

A pin 18 passes through the screw 14. The ends of the pin pass through longitudinal slots 19 in the standard 10 and extend through an engaged slot 20 formed in the meeting edges of the casings 11 and 12. This prevents the screw from turning in the casing as it is run up and down by means of the bevel gear 16.

The arms 21 and 21ª extend through similar opposite openings in the upper portion of the casing members 11 and 12, the former having a reduced loose portion 22 upon which is journalled a bevel pinion 23, which meshes with the bevel gear 16. This is retained in place by means of a washer 24 and a pin 25. The extended hub 26 of this gear has a squared opening 27 in axial alignment with the bevel pin which is adapted to receive a square mandrel 28 by means of which it may be turned to raise or lower the jack.

In operation this jack is placed under the object to be lifted, the handle 28 inserted and turned in a direction to raise the plate 15. The pitch of the screw is such as to retain the parts in any position by friction without the aid of any additional holding means. When this jack is used for jacking up the wheel of an automobile, the pinion 23 is turned so as to allow the handle 28 to be inserted through the scope of the automobile wheel.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. A screw jack comprising a standard, a longitudinal opening therethrough, a screw extending into said opening, an internally threaded bevel gear rotatable on said screw, means for preventing the screw from rotating, a lug integral with said standard having a rounded portion, a pinion journalled on said rounded portion and meshing with said bevel gear, said pinion having a hub extending beyond said lug and means on said lug to engage an axially extending wrench.

2. A screw jack comprising a standard, a longitudinal opening therethrough, a screw extending into said opening, an internally threaded bevel gear rotatable on said screw, means for preventing the screw from rotating, a lug carried by said standard having a rounded portion, a pinion journalled on said rounded portion and meshing with said bevel gear, said pinion having a hub extending beyond said lug, and a squared axial opening in said lug adapted to receive a wrench.

3. A screw jack comprising a standard, a longitudinal opening therethrough, a screw extending into said opening, an internally threaded bevel gear rotatable on said screw, a pressed sheet metal casing comprising two similar elements riveted together and enclosing said standard, means to prevent the screw from turning and a pinion meshing with said bevel gear.

4. A screw jack comprising a standard, a longitudinal opening therethrough, a screw extending into said opening, an internally threaded bevel gear rotatable on said screw, a pressed sheet metal casing for said standard, consisting of two members joined longitudinally, means to prevent the screw from turning, a pinion meshing with said bevel gear, openings in said sheet metal members and lugs extending through said openings, and a pinion journalled on one of said lugs and meshing with said bevel gear.

JOHN W. BATE.